(12) United States Patent
Patro et al.

(10) Patent No.: US 11,750,862 B2
(45) Date of Patent: *Sep. 5, 2023

(54) VIDEO QUALITY MONITORING IN A NETWORK ENVIRONMENT

(71) Applicant: Charter Communications Operating, LLC, St. Louis, MO (US)

(72) Inventors: Ajit Kumar Patro, Parker, CO (US); Puneet Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/375,664

(22) Filed: Jul. 14, 2021

(65) Prior Publication Data

US 2021/0360303 A1 Nov. 18, 2021

Related U.S. Application Data

(63) Continuation of application No. 16/683,546, filed on Nov. 14, 2019, now Pat. No. 11,109,082.

(51) Int. Cl.
  *H04N 21/24* (2011.01)
  *H04N 21/258* (2011.01)
  *H04N 21/2662* (2011.01)

(52) U.S. Cl.
  CPC ... *H04N 21/2402* (2013.01); *H04N 21/25891* (2013.01); *H04N 21/2662* (2013.01)

(58) Field of Classification Search
  CPC ......... H04N 21/2402; H04N 21/25891; H04N 21/2662
  See application file for complete search history.

(56) References Cited

U.S. PATENT DOCUMENTS

| | | | |
|---|---|---|---|
| 10,659,512 B1 | 5/2020 | Nielsen et al. | |
| 2005/0169056 A1* | 8/2005 | Berkman | H04M 11/066 365/185.22 |
| 2013/0132986 A1* | 5/2013 | Mack | H04N 21/4621 725/31 |
| 2014/0317280 A1 | 10/2014 | Ke | |
| 2014/0321298 A1* | 10/2014 | Chow | H04L 43/0829 370/252 |
| 2016/0127440 A1 | 5/2016 | Gordon et al. | |
| 2018/0376362 A1* | 12/2018 | Chen | H04N 21/647 |
| 2019/0166170 A1 | 5/2019 | Ramaswamy | |
| 2020/0186851 A1* | 6/2020 | Kahn | H04N 21/26241 |

* cited by examiner

*Primary Examiner* — Yassin Alata
(74) *Attorney, Agent, or Firm* — Armis IP Law, LLC

(57) ABSTRACT

According to one configuration, a monitor resource monitors conveyance of content streaming over a shared communication link between a server resource and a communication device, the communication device requesting segments of the content from a manifest file. Monitoring as described herein can include intercepting and inspecting data packets associated with conveyance of the content over the shared communication link. An analyzer resource analyzes bandwidth attributes of streaming the content over the shared communication link. Based on the attributes of streaming the content (such as bandwidth, adaptive bit rate, etc.) over the shared communication link, the monitor resource generates a report indicating a link quality provided to the communication device via the shared communication link conveying the stream of content.

29 Claims, 10 Drawing Sheets

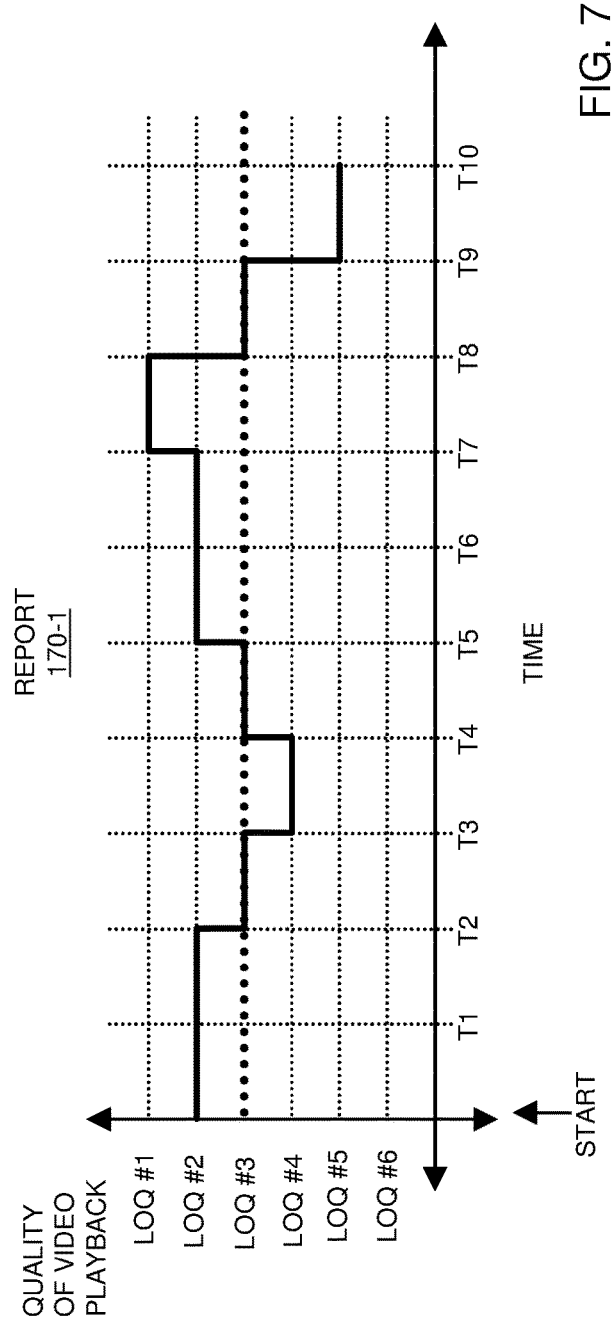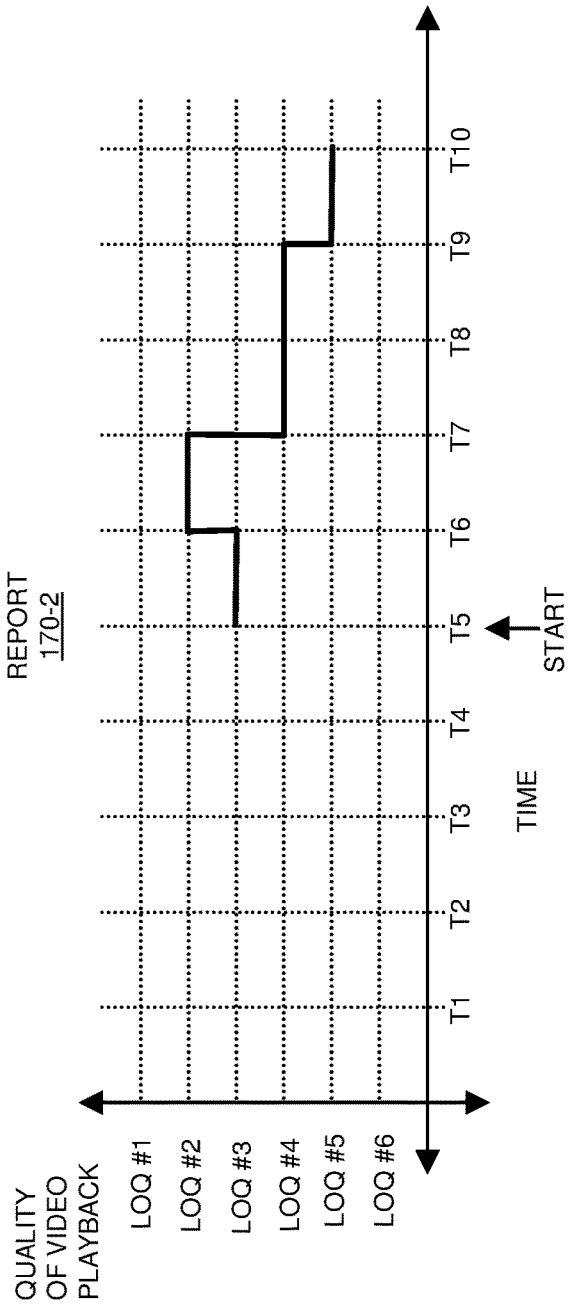
FIG. 7

VIDEO QUALITY MONITORING IN A NETWORK ENVIRONMENT

RELATED APPLICATION

This application is a continuation application of earlier filed U.S. patent application Ser. No. 16/683,546 entitled "VIDEO QUALITY MONITORING IN A NETWORK ENVIRONMENT," filed on Nov. 14, 2019, the entire teachings of which are incorporated herein by this reference.

BACKGROUND

Conventional networks support distribution of content over the Internet via use of a so-called manifest file.

For example, a user operating a client device initially requests a title of content such as video for playback. In response to receiving a request for content, a respective server resource produces and provides a manifest file to the client. The manifest file includes selectable links in which to retrieve successive portions of the requested content to be played back on a display screen.

To playback the requested content, the client device communicates with one or more servers (as indicated by the selectable links in the manifest file) to retrieve successive segments of the content for playback on the client's display screen. Based on available bandwidth in a network environment, different video profiles can be selected by a playback device.

BRIEF DESCRIPTION OF EMBODIMENTS

This disclosure includes the observation that there are deficiencies associated with conventional monitoring of video quality provided to a client device. For example, assume that a client device retrieves segments of content for playback experiences congestion on a communication link over which the different segments of content are retrieved. In such an instance, a quality of playing back respective video at the client device substantially decreases. Without monitoring, there is no way of knowing whether a content distribution service provided to a subscriber is acceptable or not.

One way that a respective content service provider can be informed of poor video service to a client device is notification (such as a call, email, etc.) from a respective subscriber viewing playback of the retrieved video content on a display screen. Receiving notification from a subscriber that they are not satisfied with a respective service is undesirable.

Embodiments herein include novel ways of being proactive about detecting quality associated with playback of content and providing corrective action to improve the link quality above an acceptable threshold (such as based on a subscription level of the user). For example, as further discussed herein, embodiments include a monitor resource as well as a Wireless Gateway Router. The communication management resource such as a Wireless Gateway Router and corresponding monitor resource can be used as VQM (Video Quality Monitor) by intercepting the Adaptive bitrate profile information (such as in requests or responses) associated with retrieved content being played back on a communication device.

More specifically, a communication system as described herein includes a monitor resource. The monitor resource monitors conveyance of content transmitted (such as streaming) over a shared communication link between a content distribution resource (such as one or more server resources) and a communication device. In one embodiment, the communication device requests segments of the content based on pointers (such as URLs) in a manifest file. Monitoring of the conveyed content via a monitor resource can include any suitable functions such as intercepting and inspecting data packets associated with conveyance of the requested segments of content over the shared communication link.

As further discussed herein, embodiments herein include a wireless gateway router that is used to monitor video quality based on intercepting adaptive bitrate profiles of the playing back video content.

In one embodiment, the monitor resource (or other suitable resource such as disposed in a gateway of a subscriber domain) analyzes conveyed communications to determine bandwidth attributes of transmitting the content through a gateway (such as a communication management resource) over the shared communication link. Based on the bandwidth attributes of transmitting (conveying) the content over the shared communication link, the monitor resource generates a report indicating an experience associated with the playback device and corresponding user retrieving the segments of content. In one embodiment, the interception and analysis of the data packets associated with communications itself does not impact (such as delay) communications between a respective playback device and corresponding server resource from which segments of content are retrieved.

In accordance with further embodiments, monitoring the conveyance of the content streaming over the communication link includes: intercepting multiple data packets transmitted over the shared communication link. The data packets can be requests for segments of content from the playback device or the requested segments of content from the content distribution resource.

In one embodiment, each of the multiple data packets includes information indicating a respective requested segment of the stream of content as specified by the manifest file. As previously discussed, in one embodiment, the monitor resource analyzes bandwidth attributes associated with conveyance of the segments of content. Via the multiple intercepted data packets, the monitor resource determines or tracks an adaptive bit rate (bandwidth) at which the segments of content are retrieved by the playback device. An analyzer resource compares the determined adaptive bit rate to a bandwidth threshold value assigned to the playback device or corresponding user to determine whether the user is able to retrieve the content at an appropriate bit rate (or level of quality) associated with the user's subscription.

In a yet further non-limiting example embodiment, one or more bandwidth report generated by the monitor resource (such as based on segment request and/or segment response communications) indicates a respective quality level rating of a corresponding user experience of viewing playback of the requested segments of content via a playback device. For example, if the segments of content requested by the playback device are on average a very low bit rate, it is assumed that the playback quality by the playback device is poor. If the segments of content requested by the playback device are on average a very high bit rate, it is assumed that the playback quality by the playback device is good.

In accordance with still further embodiments, an analyzer resource receiving the bandwidth reports from the monitor resource is operative to, via the comparing of the actual retrieval bandwidth to a threshold value, detect that the determined adaptive bit rate (such as level of quality parameter) falls below the bandwidth threshold value. In such an instance, the analyzer resource generates a notification indicating that the adaptive bit rate at which the segments of content are retrieved by the communication device falls below a bandwidth threshold value, signaling a condition that needs to be at least reviewed or possible corrected.

Variation in an adaptive bit rate of retrieving segments of content by the playback device can occur for any number of reasons. For example, in one embodiment, the adaptive bit rate or retrieving segments of content falls below the bandwidth threshold value based on occurrence of a fault condition associated with the communication link over which segments of content are retrieved. To provide notification of the anomaly (such as congestion causing poor video playback quality by the client playback device), the monitor resource communicates the report of the fault over a dedicated reporting communication link to a remote management entity such as an analyzer resource.

In one embodiment, the analyzer resource at the remote management entity dispatches a technician to fix the fault in the communication link associated with the subscriber. Thus, in one embodiment, the subscriber experiencing poor bandwidth service via a shared communication link need not call a service provider to correct a fault condition. The monitor resource generates such a notification.

Note that any suitable parameters associated with conveyed communications between a playback device and a corresponding server delivering the segments of content can be used as a basis to determine the rate at which the playback device retrieves and/or plays back video content.

For example, in one embodiment, the monitor resource analyzes communications such as requests (from a playback device) for segments of content to determine a respective user experience associated with playing back content. Communications between the playback device and the one or more servers indicates the requested adaptive bit rate at which the segments of content are to be delivered to the playback device.

In accordance with yet further embodiments, a magnitude of the threshold value bandwidth to be provided to the playback device corresponds to a subscription level assigned to a subscriber domain, user, etc., in which the playback device is registered for use. Additionally, or alternatively, the monitor resource can be configured to monitor data packets including the actual requested segments of content (as transmitted from the content distribution resource to the playback device) to identify and track a vary bit rate at which the segments of content are retrieved from one or more server resources.

Thus, via monitoring of data packets and a varying bit rate of requesting retrieval of the content, embodiments herein include monitoring a health status (such as bandwidth) of a communication link provided by a respective service provider to a subscriber.

In one embodiment, the monitor resource or other suitable resource (such as hardware and/or software) is further operative to process the manifest file used by the playback device to selectively retrieve the different segments of content. Via processing (analysis) of the manifest file, the monitor resource identifies different adaptive bit rate values or profiles at which the segments of the content are selectively retrievable by the communication device.

In accordance with further embodiments, as previously discussed, the monitor resource analyzes bandwidth attributes of streaming the content over the shared communication link. In one embodiment, analysis of the bandwidth attributes of the streaming content includes: retrieving adaptive bit rate metrics (such as playback bit rate information) from data packets conveying the content over the shared communication link to the playback device; comparing the adaptive bit rate metrics to the adaptive bit rate values as specified by the manifest file; and based on the comparing, identifying a rates at which the communication device selectively retrieves the segments of content over the shared communication link. As previously discussed, monitoring of the rates enables the service provider to determine whether the subscriber receives content at an appropriate level of quality associated with his subscription.

Note that further embodiments herein include monitoring retrieval of adaptive bit rate content by multiple playback devices in a respective subscriber domain. For example, the monitor resource as described herein can be configured to monitor (such as intercepts and inspects data packets associated with) conveyance of first content streaming (conveyed) over a shared communication link; the first content being retrieved by the first playback device via a first manifest file. The monitor resource further monitors (such as intercepts and inspects data packets associated with) conveyance of second content streaming over the shared communication link; the second content being retrieved via a second manifest file. The monitor resource analyzes bandwidth consumption associated with conveying the first content and the second content over the shared communication link.

Based on the analysis of bandwidth consumption from multiple playback devices, the monitor resource generates a bandwidth report indicating the individual and potentially overall bandwidth consumption.

In accordance with yet further embodiments, the monitor resource or analyzer resource produces a metric representing a summation of the first bandwidth and the second bandwidth associated with the subscriber domain. The summation represents an amount of overall bandwidth used to retrieve content via the first communication device and the second communication device in the subscriber domain. In one embodiment, the monitor resource compares the summation to a bandwidth threshold value assigned to the subscriber domain to determine if the subscriber domain receives appropriate use of bandwidth in the shared communication link. In one embodiment, the analyzer resource can be configured to determine that low playback quality is caused by multiple devices simultaneously retrieving and playing back content. The corresponding low bandwidth to the combination of playback devices may be due to a low subscription level assigned to the subscriber domain.

In accordance with further embodiments, in response to detecting a condition in which the summation is less than a bandwidth threshold value associated with the subscriber domain (but in which the bandwidth to the playback devices should be higher), the monitor resource and/or analyzer resource generates a notification of the condition to appropriate personnel so that the condition can be corrected, assuming the low detected low bandwidth provided to multiple playback devices in a subscriber domain is improper. In one embodiment, because the bandwidth is below a threshold value, there may be a fault in the network.

In accordance with further embodiments, the system as described herein monitors the real time quality of video provided to each of multiple subscribers' homes while the customers watch respective selected video programs (using one or more manifest files). In one embodiment, as previously discussed, a communication management resource intercepts and inspects conveyed communications (such as data packets) as described herein is a wireless router inside a respective house. Such a router can be instantiated to monitor each device and retrieval of content in a subscriber domain without violating the privacy of a subscriber. Depending on link quality determined via the monitoring, the communication management resource (or other suitable resource) generates one or more real time alerts to a service provider (service provider personnel) so that any anomalies (such as network failures reducing communication link quality below a threshold value) are properly addressed via the service provider. Accordingly, embodiments herein are useful over conventional techniques. That is, as further discussed herein, the novel manner of monitoring of communications associated with playback of content as described herein ensures that a respective subscriber is able to playback content at an appropriate level of quality to which the user subscribes without the user having to manually contact the service provider.

Note that any of the resources as discussed herein can include one or more computerized devices, user equipment, wireless communication devices, gateway resources, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to monitor link quality/bandwidth associated with communications conveyed over a shared communication link. The instructions, when executed by the computer processor hardware, cause the computer processor hardware (such as one or more co-located or disparately processor devices or hardware) to: monitor communications associated with conveyance of content transmitted over a shared communication link between a server resource and a communication device, the communication device requesting segments of the content from a manifest file; analyze attributes associated with transmitting the content over the shared communication link; and based on the attributes associated with transmitting the content over the shared communication link, generating a report indicating a quality status of the shared communication link conveying the requested segments of content.

Another embodiment as described herein includes a computer readable storage medium and/or system having instructions stored thereon to monitor link quality associated with communications conveyed over a shared communication link. The instructions, when executed by the computer processor hardware, cause the computer processor hardware (such as one or more co-located or disparately processor devices or hardware) to: monitor conveyance of first content streaming over a shared communication link, the first content retrieved via a first manifest file; monitor conveyance of second content streaming over the shared communication link, the second content retrieved via a second manifest file; analyze bandwidth consumption associated with conveying the first content and the second content over the shared communication link; and generate a bandwidth report indicating the bandwidth consumption.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of conveying wireless communications in wireless network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 7 is an example diagram illustrating an example report indicating variability in bandwidth and link quality associated with requested segments of content according to embodiments herein.

Figure 1:
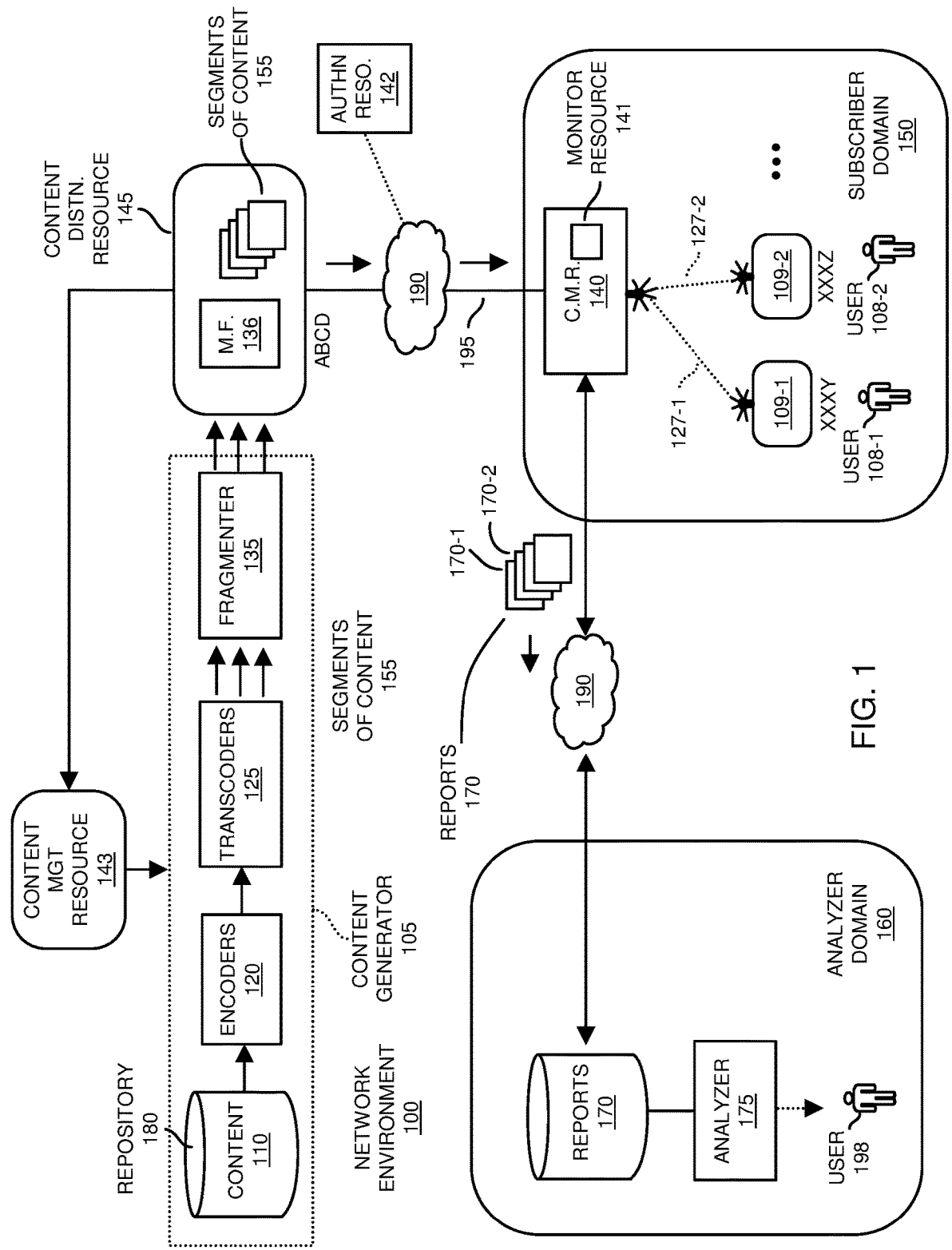
FIG. 1 is an example diagram illustrating a content distribution system and monitoring of streaming requested segments of content according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments herein, a monitor resource monitors retrieval of content (such as segments of content) over a shared communication link between one or more server resources and each of multiple communication devices requesting retrieval of the content using a manifest file. Monitoring can include intercepting and inspecting data packets associated with conveyance of the content over the shared communication link. Via inspection of the data packets, the monitor resource analyzes bandwidth (link quality) attributes of streaming the content over the shared communication link. Based on the monitored attributes of streaming the content over the shared communication link, the monitor resource generates a report indicating a status of the shared communication link conveying the stream of content.

Accordingly, embodiments herein include monitoring of a real time video playback experience of one or more viewers retrieving respective one or more titles of content and providing notification of same to service provider personnel.

In one embodiment, IP (Internet Protocol) streaming devices inside a home are connected via an MSO (Multi-System Operator) managed wireless router. Such a router streams video to the TV (Television) applications of the playback devices via adaptive bit rate HTTP streaming (using Multi bitrate video stream profiles). During operation, the playback device selects a lower bitrate video profile during playback during network congestion. In such an instance, the user experiences poor quality playback of retrieved video segments on a display screen.

Embodiments herein include implementing, such as in the router or other suitable resource, a monitoring probe associated with the MSO to monitor the actual video experience of the viewer inside a home when the subscriber is watching programs. The probe monitors data flows associated with requested segment of content as specified by a manifest file. In one embodiment, such data is used by the service provider (such as MSO) to improve the communication link and corresponding quality of viewing experience provided to the subscriber.

Now, more specifically, FIG. 1 is an example diagram illustrating a content distribution system and monitoring of streaming content according to embodiments herein.

As shown, the communication system in FIG. 1 includes content generator 105, content distribution resource 143, content distribution resource 145, network 190, subscriber domain 150, authentication resource 142, and analyzer domain 160.

Content generator 105 includes repository 180 (storing available content 110), encoders 120, transcoders 125, and fragmenter 135. In general, content generator 105 receives input from content management resource 143 indicating which of one or more titles of stored content to convert into different adaptive bit rate data streams served from the content distribution resource 145.

To produce adaptive bit rate segments of content (chunks of video at different transmission bandwidths), the encoders retrieve a respective to from repository 180. As their name suggests, the encoders 120 encode the retrieved title of content into encoded content. Transcoders 125 convert the encoded content into one or more desirable encoding formats. Fragmenter 135 parses the encoded content from the transcoders 125 into different bit rate encoded segments of content associated with each respective title of content and stores them as segments of content 155 for on-demand distribution via the content distribution resource 145.

In addition to generating segments of content available at different adaptive bit rates, the content generator 105 or other suitable resource such as the content distribution resource 145 produces a manifest file 136 indicating how to retrieve the different segments of content for a given title of content.

Content distribution resource 145 stores manifest file 136 as well as corresponding segments of content 155 associated with the retrievable content. The manifest file includes pointers (such as URLs) indicating a source from which to retrieve different segments of content for each of the different adaptive bit rates at which the segments of content have been encoded.

In one embodiment, each of the playback devices requests multiple segments of content (such as 6 segments or any other suitable number) at a time for retrieval. Each of the segments can support any suitable playback time. In one nonlimiting example embodiment, the playback time supported by each segment is approximately 6 seconds. The segments of content (such as portions of a transport stream or .ts files) can be encoded in any suitable format.

Further in this example embodiment, the shared communication link 195 supports connectivity between the subscriber domain 150 (and other subscriber domains) in network environment 100 and the content distribution resource 145. Different portions of bandwidth associated with the shared communication link 195 are allocated to support distribution of content to different subscriber domains depending on a subscription level associated with the subscriber domain. The amount of bandwidth allocated to deliver content to each subscriber domain can vary depending on an amount of subscription fees paid by the subscriber associated with a subscriber domain.

Subscriber domain 150 includes communication management resource 140 (such as a Wireless Gateway Router that monitors selected adaptive bitrate profiles of playing back video content), playback device 109-1 operated by user 108-1, and playback device 109-2 operated by user 108-2, etc. Communication link 127-1 (such as a wired or wireless communication link) supports communications between the playback device 109-1 and the communication management resource 140. Communication link 127-2 (such as a wired or wireless communication link) supports communications between the playback device 109-2 and the communication management resource 140.

Note that wireless communication links can be any suitable type of communication link such hardwired or wireless and support any suitable communication protocol.

Note further that the communication management resource 140 further includes monitor resource 141. As further discussed herein, and as its name suggests, the monitor resource 141 monitors communications between the playback devices 109 and the content distribution resource 145 and generates respective reports 170 (such as report 170-1 associated with playback device 109-1, report 170-2 associated with 109-2, etc.).

In one embodiment, each of the reports 170 indicates information indicating a playback experience associated with playback devices playing back retrieved content.

As further shown, network environment 100 includes analyzer domain 160. Analyzer domain 160 is disposed at a remote location with respect to the subscriber domain 150 in network environment 100. Analyzer domain 160 includes a repository that receives and stores reports 170.

In one embodiment, the communication link between the communication management resource 140 and the analyzer domain 160 is a so-called TR069 link through a network such as an n HFC (Hybrid Fiber Coaxial) network, EPON (Ethernet Passive Optical Network), etc.

Analyzer domain 160 further includes corresponding analyzer 175 that analyzes the reports 170 and provides notification of same to the service provider support staff (such as technician, customer service personnel, etc.) that address any issues as indicated by the reports 170.

Thus, in this example embodiment, as its name suggests, the monitor resource 140 monitors conveyance of communications conveyed over a respective shared communication link between content distribution resource 145 (such as one or more server resources) and the playback devices 109.

During operation, each playback device 109 (such as mobile communication device or user equipment) requests segments of the content based on a retrieved manifest file. As previously discussed, the retrieved manifest file 136 indicates different segments of content associated with playback of a title of video content. In one embodiment, monitoring of the conveyed communications between the playback devices 109 and the content distribution resource 145 via monitor resource 141 includes any suitable functions such as intercepting and inspecting conveyed communications such as data packets, segments of content, etc., associated with conveyance of the content over the shared communication link 195.

As previously discussed, in one embodiment, conveyance of content includes the playback device requesting one or more segments of content and the content distribution resource 145 communicating the requested one or more segments of content to the playback device.

In accordance with further embodiments, the monitor resource (or other suitable resource) records bandwidth attributes, bit rate information, etc., associated with transmitting of the content over the shared communication link 195 and the communication links 127. Based on the collected information associated with the conveyance of content over the communication link, the monitor resource 140 generates reports 170 (bandwidth reports, playback experience reports, level of quality reports, etc.) indicating a status of the shared communication link 195, communication link 127, etc., conveying the one or more streams of content segments.

Note that any number of parameters may affect the link quality or rate of conveying segments of content from the content distribution resource 145.

For example, a respective playback device requesting playback of content may not be able to process the retrieved content at a sufficient rate to playback the retrieved content at a highest possible level of quality. The communication link 127 between a respective playback device and the communication management resource 140 may be bandwidth limited, preventing conveyance of high bandwidth communications between the respective playback device and the content distribution resource 145. The communication management resource 140 (such as gateway) may experience congestion, resulting in delayed communications of forwarding requests for segments of content to the content distribution resource 145. The communication management resource 140 (such as gateway) may experience congestion, resulting in delayed communications of forwarding the requested segments of content received from the content distribution resource 145 to a respective playback device. Shared communication link 195 may experience congestion in which an insufficient amount of bandwidth is available to convey requests for content and requested segments of content. Content distribution resource 145 may experience an overload condition in which the content distribution resource 145 is unable to process requests at a sufficiently high rate and communicate requested segments of content at an adaptive bit rate as requested by a corresponding playback device.

In accordance with further example embodiments, monitoring the conveyance of the stream of content requests and corresponding content streaming over the communication path between a respective playback device and the content distribution resource 145 includes: intercepting multiple data packets transmitted over the shared communication link. The intercepted communications indicate an adaptive bit rate at which a respective playback device requests retrieval of content.

In one embodiment, the data packets intercepted by the monitor resource 141 are requests for segments of content or the requested segments of content themselves.

For example, in one embodiment, each of multiple data packets from the playback device 109-1 indicate a respective requested segment of the stream of content as specified by the manifest file. The monitor resource 140 analyzes bandwidth attributes associated with conveyance of the segments of content as specified by the request. Additionally, or alternatively, the monitor resource analyzes the segments of content transmitted from the content distribution resource 145 to a respective playback device to determine a playback experience produced to a subscriber user.

In one embodiment, the comparison of the determined bandwidth rate of conveying content from the content distribution resource 145 to the playback device 109-1 indicates a health status of the respective playback experience. For example, if a user 108-1 pays a highest subscription level for a retrieval service, then the user 108-1 and corresponding playback device 109-1 should be able to retrieve segments of content at the highest bit rate possible. If the analyzer 175, when analyzing received reports 170, detects that the user 108-1 is unable to retrieve content at an appropriate bit rate based on (a poor health status) as indicated by a respective report 170-1, then it is known that there may be a failure associated with one or more compliments between the user equipment 109-1 and the content distribution resource 145. Conversely, if the analyzer 175, when analyzing received reports 170, detects that the user 108-1 is able to retrieve content at an appropriate bit rate based on (a good health status) as indicated by a respective report 170-1, then it is known that there probably are no failures associated with one or more components between the user equipment 109-1 and the content distribution resource 145.

In one non-limiting example embodiment, the one or more reports 170-1, 170-2, etc., generated by the monitor resource 140 (based on request and/or response communications) indicates a respective quality level rating of a corresponding user experience of viewing playback of the requested segments of content via a playback device. Thus, the monitor resource 141 can be configured to monitor data retrieval flows associated with each of multiple playback devices in the subscriber domain 150.

In accordance with yet further embodiments, based on the monitoring as described herein, the monitor resource 141 can be configured to monitor retrieval and playback of content by multiple playback devices. In one embodiment, the monitor resource 141 or the analyzer resource 175 analyzing the reports 170, produces a metric representing a summation of bandwidth afforded to the playback devices 109. For example, the monitor resource 141 can be configured to identify a first bandwidth afforded to the playback device 109-1 to retrieve a respective first title of content from the content distribution resource 145. The monitor resource 141 can be configured to identify second bandwidth afforded to the playback device 109-2 to retrieve a respective second title of content from the content distribution resource 145.

In one embodiment, a summation value produced by the analyzer resource 175 (based on reports 170) represents an amount of overall bandwidth used to retrieve content via the first playback device 109-1 and the second playback device 109-2 in the subscriber domain 150. If desired, the monitor resource 141 and/or the analyzer 175 compares the summation value to a bandwidth threshold value assigned to the subscriber domain 150 to determine if the subscriber domain 150 and corresponding playback devices 109 receive appropriate bandwidth in the shared communication link 195 to retrieve content.

In accordance with further embodiments, in response to detecting a condition in which the summation value (of bandwidth to the playback device 109-1 and playback device 109-2) is less than a bandwidth threshold value associated with the subscriber domain 150, the analyzer resource 175 produces a notification indicating that the subscriber domain 150 is not receiving sufficient bandwidth. In one embodiment, in response to detecting such a condition based on the reports 170, the analyzer resource 175 provides notification of the condition to appropriate personnel so that the condition can be corrected. In such an instance, because the collective bandwidth to the combination of playback devices is below a threshold value and corresponding expected level of service to be provided to the subscriber domain 150 and corresponding playback devices 109, there may be a fault in the network environment 100.

Further embodiments herein can include monitoring different components in a network such as the playback devices 109, communication links 127, communication management resource 140, shared communication link 195, content distribution resources, etc., to determine which of such components is preventing the playback devices 109 and/or corresponding subscriber domain 150 from receiving appropriate playback services.

In a yet further non-limiting example embodiment, the communication management resource 140 and/or monitor resource as described herein is an intelligent WiFi™ router that processes the wireless packets and inspects corresponding HTTP (HyperText Transfer Protocol) requests and/or responses associated with television applications of the streaming devices (like HTTP proxy, that allows to view all of the HTTP and SSL/HTTPS traffic between machine and the Internet). The communication management resource 140 monitors the real time video quality experience of a respective subscriber's home by determining the video profile selection possibilities from manifest files and providing notification (via one or more reports 170) to the network operator of the MSO about the bandwidth capability provided to the subscriber domain 150 and/or corresponding playback devices 109.

As previously discussed, based on the reports 170, the network operator (service provider) can be configured to gather link health information, retrieval bandwidth rates, etc., from multiple homes (multiple subscriber domains) in a region and utilize such data to take appropriate action to improve video playback experience.

Note further that each of the resources as described herein can be implemented as hardware, software, or a combination of both hardware and software. For example, the content management resource 143 can be implemented as content management hardware and/or content management software; the content distribution resource 145 can be implemented as content distribution hardware and/or content distribution software; the authentication resource 142 can be implemented as authentication hardware and/or authentication software; communication management resource 140 can be implemented as communication management hardware and/or communication management software; monitor resource 141 can be implemented as monitor hardware and/or monitor software; playback device 109-1 can be implemented as playback hardware and/or playback software; playback device 109-2 can be implemented as playback hardware and/or playback software; analyzer 175 can be implemented as analyzer hardware and/or analyzer software; and so on.

Figure 2:
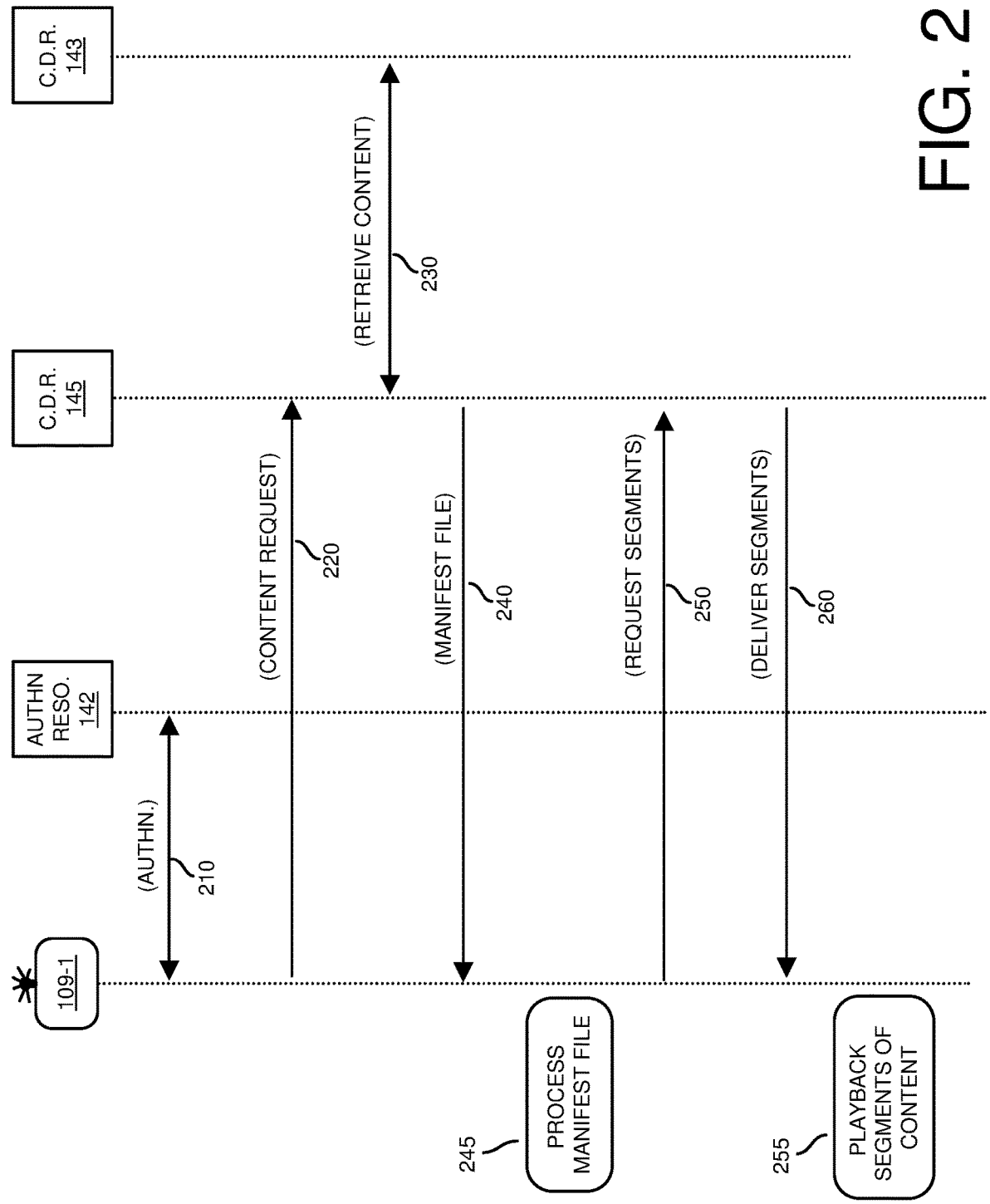
FIG. 2 is an example diagram illustrating request and retrieval of segments of content according to embodiments herein.

FIG. 2 is an example diagram illustrating request and retrieval of segments of content according to embodiments herein. This non-limiting example embodiment illustrates how each respective playback device retrieves content from a content distribution resource 145 for playback.

Via communications 210 transmitted from the playback device 109-1 to the authentication resource 142, the playback device 109-1 is authenticated to retrieve content from the content distribution resource 145.

Subsequent to authentication, via communications 220 conveyed through the communication management resource 142 the content distribution resource 145, the playback device 109 requests a specific title of video content (such as Superman) for retrieval.

In one embodiment, if the content delivery resource 145 does not currently have the requested title of video content in a retrievable adaptive bit rate format (including segments of content and corresponding manifest file), via communications 230, the content delivery resource 145 requests the selected title of content from the content management resource 143. In response to the request, the content management resource 143 provides the requested title of video content (which also includes a manifest file and corresponding retrievable adaptive bit rate segments of content to the content distribution resource 145).

In response to receiving the selection of content (such as a specific title of content) from the playback device 109-1, via communications 240, the content distribution resource 145 communicates the appropriate manifest file 136 to the playback device 109-1.

In processing operation 245, the playback device 109-1 processes the received manifest file 136 and selects segments of content for retrieval. In one embodiment, the playback device requests a first set of segments of content for playback. While playing the first set of retrieved segments of content, the playback device requests a second set of segments of content; while playing back the second set of retrieved segments of content, the playback device requests a third set of segments of content; and so on.

Via communications 250 (such as requests for different segments of content as specified by the manifest file) transmitted from the playback device 109-1 over the wireless communication link 127-1 through the communication management resource 140 and shared communication link to the content distribution resource 145, the playback device 109-1 requests the different sets of segments of content from the content distribution resource 145.

Via communications 260 (such as response including requested segments of content as specified by the playback device 109-1) transmitted from the content distribution resource 145 over the shared communication link 195 through the communication management resource 140 and communication link 127-1 to the playback device 109-1, the content distribution resource 145 delivers the requested segments of content to the playback device 109-1. In one embodiment, the playback device 109 selects from different possible adaptive bit rate encoded content depending on factors such as available link bandwidth, ability to process and playback content so there are no dead times of playing back video because successive segments of content have not yet been received, etc.

In processing operation 255, as previously discussed, the playback device 109-1 plays back a rendition of the retrieved segments of content in an appropriate logical order on a respective display screen of the playback device 109-1 for viewing by the user.

Note that the playback device 109-2 operates in a similar manner of requesting retrieval of content and using a respective manifest file to retrieve different segments of content at different adaptive bit rates for respective playback of second requested content.

Figure 3:
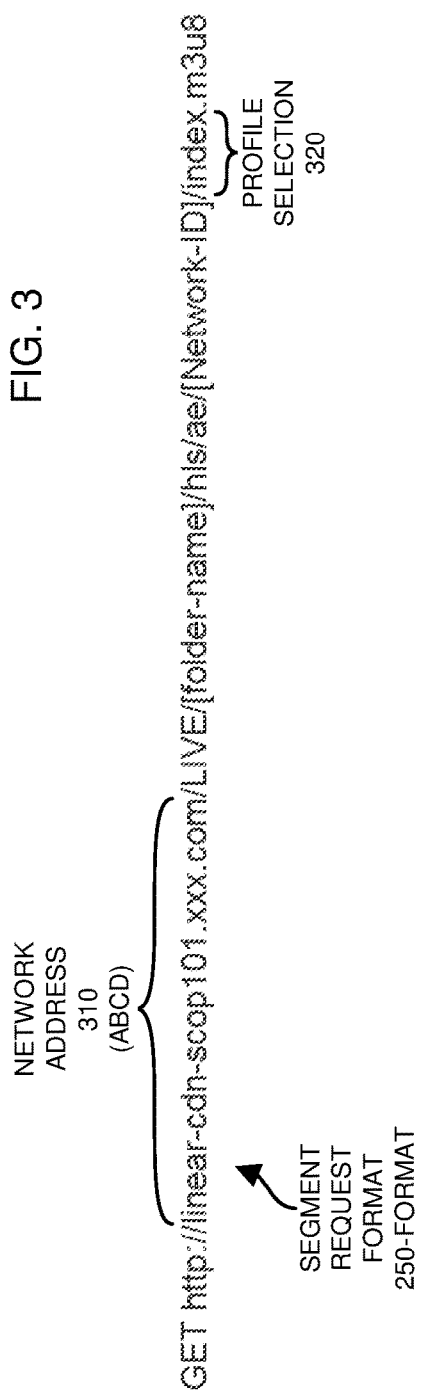
FIG. 3 is an example diagram illustrating a manifest file and corresponding different profiles (levels of quality) of available content according to embodiments herein.

FIG. 3 is an example diagram illustrating a manifest file and corresponding different profiles (levels of quality) of available content according to embodiments herein.

In this example embodiment, the manifest file 136 indicates the different levels of quality of segments of content available to the playback devices 109.

For example, manifest file 136 indicates availability of: i) first segments of content encoded at a first adaptive bit rate level of quality #1 (5500.m3u8); ii) second segments of content encoded at a second adaptive bit rate level of quality #2 (3400.m3u8); iii) third segments of content encoded at a third adaptive bit rate level of quality #3 (1400.m3u8); iv) fourth segments of content encoded at a fourth adaptive bit rate level of quality #4 (900.m3u8); v) fifth segments of content encoded at a fifth adaptive bit rate level of quality #5 (150.m3u8); and vi) sixth segments of content encoded at a sixth adaptive bit rate level of quality #6 (100.m3u8).

As further shown in FIG. 3, a respective playback device 109 uses the segment request format 250-FORMAT (such as GET HTTP request) to retrieve the segments of content associated with the requested title of content from the content distribution resource 145. In this example embodiment of FIG. 3, the segment request format 250-FORMAT used by the playback device to request a respective one or more segments of content includes a data field specifying the network address 310 (such as ABCD) of the content distribution resource 145 to which the playback device sends the request.

Additionally, the segment request format 250-FORMAT (request) used by the playback device to request segments of content includes a data field specifying an adaptive bit rate profile selection 320. The adaptive bit rate profile selection 320 (as shown in FIG. 4) indicates the adaptive bit rate or level of quality at which the corresponding requested one or more segments of content are being requested.

Figure 4:
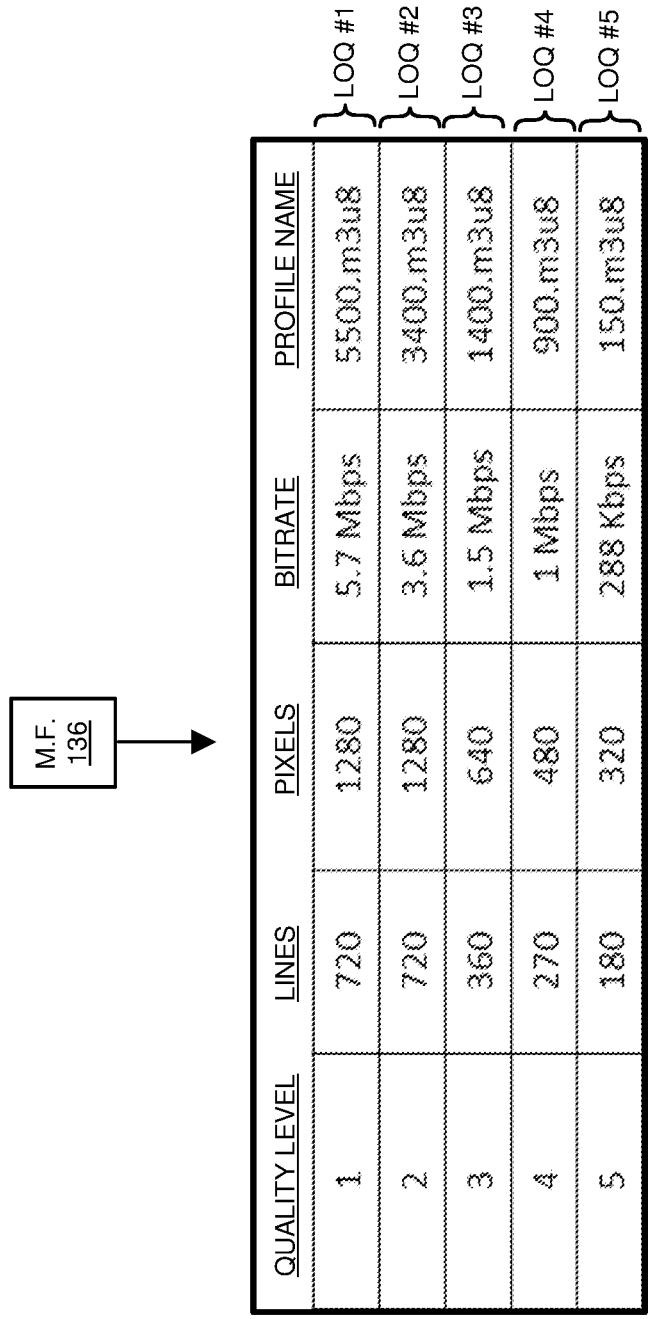
FIG. 4 is an example diagram illustrating different adaptive bit rate segments of content available for retrieval as indicated by a manifest file according to embodiments herein.

FIG. 4 is an example diagram illustrating different adaptive bit rate segments of content available for retrieval as indicated by a manifest file according to embodiments herein.

In one embodiment, the monitor resource 141 processes the manifest file 136 to identify the different available adaptive bit rate bandwidth or level of quality available to the playback device 109-1.

In this example embodiment, the manifest file 136 indicates playback level of qualities including: level of quality #1 (5500.m3u8), level of quality #2 (3400.m3u8), level of quality #3 (1400.m3u8), level of quality #4 (900.m3u8), level of quality #1 (150.m3u8), etc.

Accordingly, certain embodiments herein include, via the monitor resource (such as hardware and/or software) or other suitable resource, processing (analyzing) the manifest file 136 to identify the different adaptive bit rates or profiles at which the segments of the content are selectively retrievable by the playback communication devices.

Additionally, or alternatively, note that the monitor resource 141 can be configured to communicate with the content distribution resource 145 or other suitable resource to learn of the different available adaptive bit rate bandwidth of content.

Figure 5:
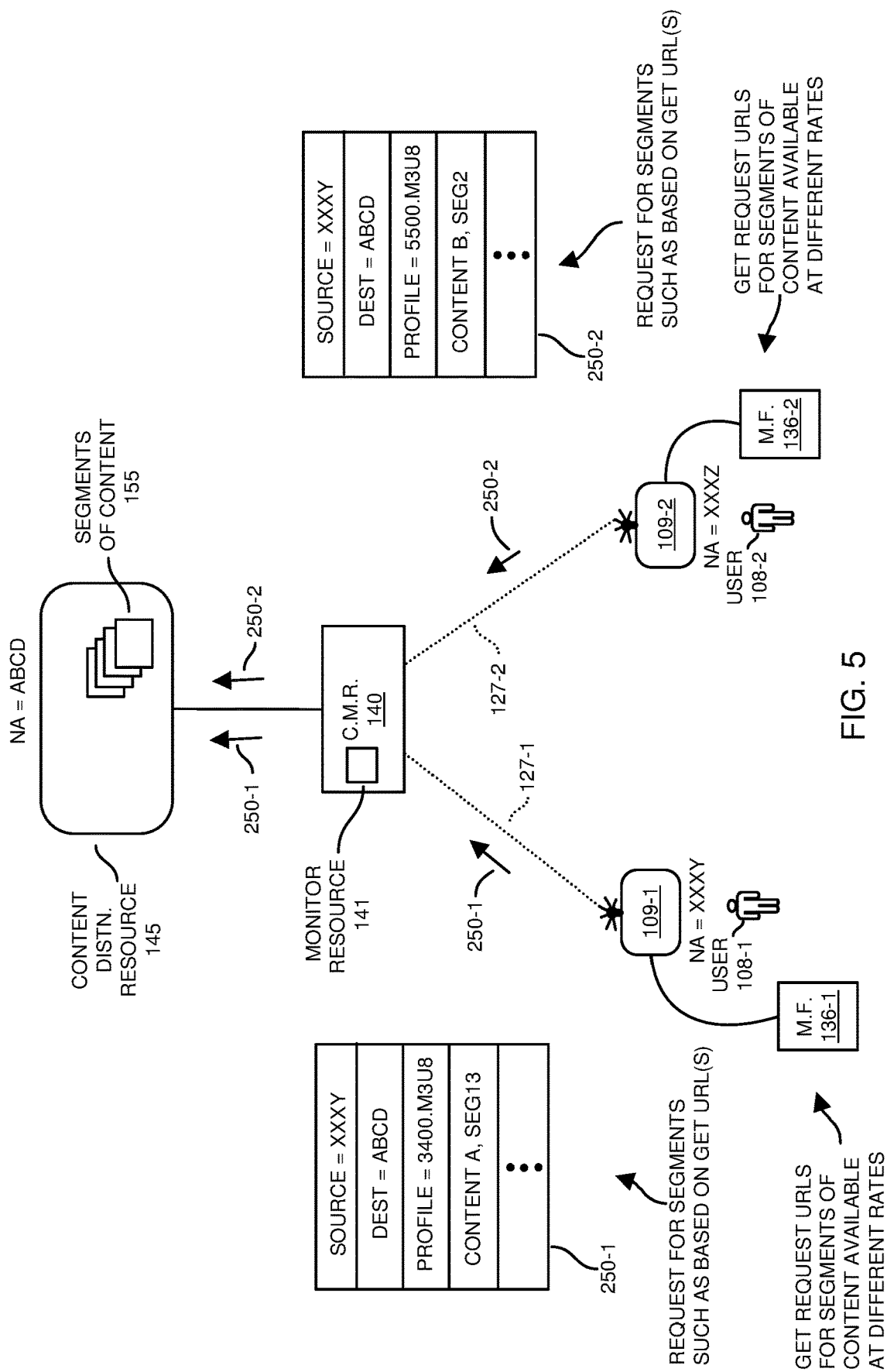
FIG. 5 is an example diagram illustrating interception and inspection of data flows (such as requests for segments of content) according to embodiments herein.

FIG. 5 is an example diagram illustrating interception and inspection of data flows (such as requests for segments of content) according to embodiments herein.

In accordance with further embodiments, monitoring the conveyance of the content streaming over the communication path between the playback device 109-1 and the content distribution resource 145 includes: intercepting multiple data packets (such as any request information associated with adaptive bit rate playback) conveyed between the playback device 109 and the content distribution resource 145.

In one embodiment, the data packets are content segment requests 250-1 (such as based on the request format 250-FORMAT in FIG. 3) communicated from the playback device 109-1 to the content distribution resource 145.

Note that the requests 250 for content can be the URLs themselves transmitted to the communication management resource 140 and that are used by the respective communication device to retrieve segment of content at a particular desired adaptive bit rate profile. Additionally, or alternatively, the requests 250 can be request information derived from one or more respective URLs that are used to retrieve the different segments of adaptive bit rate content.

Via the request information associated with each of the individual requests 250 for content, whether the request information is in the form of a URL or other suitable request format, as further discussed herein, the monitor resource 140 identifies the different bit rates at which the corresponding communication device retrieves content. FIG. 3 indicates use of a specific profile selection data field 320 indicating a respective chosen adaptive bit rate, a setting of which changes over time depending on the different selected adaptive bit rates.

For example, referring again to FIG. 5, each of the requests 250-1 (one or more data packets, request information, etc.) indicates a respective requested segment of the stream of content as specified by the manifest file 136. The monitor resource 141 analyzes bandwidth attributes and/or user playback experience associated with conveyance of the segments of content based on the requests 250-1. For example, via the requests 250-1, the monitor resource 141 determines an adaptive bit rate at which the segments of content are being retrieved over time by the playback device 109-1.

As previously discussed, the monitor resource 141 or other suitable resource such as analyzer resource 175 can be configured to compare the determined adaptive bit rate of the playback devices retrieving content to a bandwidth threshold value assigned to the playback device or corresponding user. Such a comparison indicates whether the playback device 109-1 is able to retrieve the segments of content at an appropriate rate for a subscription level of the subscriber associated with subscriber domain 150.

Note again that any suitable parameters associated with conveyed communications between a playback device and a corresponding server (such as content distribution resource 145) delivering the segments of content can be used as a basis to determine the bandwidth rate at which the playback device retrieves and/or plays back video content. For example, in this example embodiment, the monitor resource 141 intercepts and analyzes communications such as requests (from a playback device) for segments of content communicated from the playback device to determine a respective user experience associated with playing back content. In certain instances, communications between the playback device and the content distribution resource (such as one or more servers) indicate the adaptive bit rate at which the segments of content are delivered to the playback device as further discussed below.

In accordance with further embodiments, the monitor resource 141 tracks/records adaptive bit rates at which the segments of content are requested for retrieval by the requesting playback communication device. For example, as previously discussed, the playback device (communication device) can be configured to retrieve the segments of content via selection amongst multiple available retrieval bit rates as specified by a manifest file 136-1. In one embodiment, to determine a video quality of content being played back on the playback device, the monitor resource 141 or analyzer resource 175 compares the tracked adaptive bit rates at which the segments of content are requested for retrieval (by the playback device) to a threshold value assigned to the communication device or respective subscriber domain to determine if the user 108-1 is able to view a rendition of the retrieved content at an appropriate level of quality.

In this example embodiment, the monitor resource 141 intercepts request 250-1 from the playback device 109-1 to determine a user's viewing experience. For example, via source=XXXY in a respective data field, the request 250-1 indicates the playback device (network address=XXXY) as the playback device communicating the request 250-1 for a particular stream of content A segment #13 (for example one or more of segments of content 155) in a respective sequence. Request 250-1 further indicates the destination network address=ABCD (assigned to content distribution resource 145) to which the request 250-1 is being delivered over shared communication link 195.

Further in this example embodiment, the intercepted request 250-1 indicates the adaptive bit rate profile information (such as profile=3400.m3u8) associated with the requested one or more segments of content. The profile 3400.m3u8 indicates a bit rate at which the requested segment of content is encoded, which indicates a bandwidth of the communication path used to convey such data.

As further shown, the communication management resource 140 forwards the request 250-1 to the content distribution resource 145 for retrieval of the requested segment of content.

In a similar manner, the communication management resource 140 intercepts and inspects requests 250-2 from the playback device 109-2 to determine which playback device sent the segment of content request, what stream of content and segment or segments (content A segment 2) are being requested, the adaptive bit rate profile (profile=3400.M3U8) and bandwidth associated with the requested segment of content, etc.

In this manner, the playback device 109-1 and playback device 109-2 repeatedly request different segments of content at potentially different adaptive bit rates from the content distribution resource 145. Interception and analysis of such data packets provides data to generate a respective playback report 170.

Figure 6:
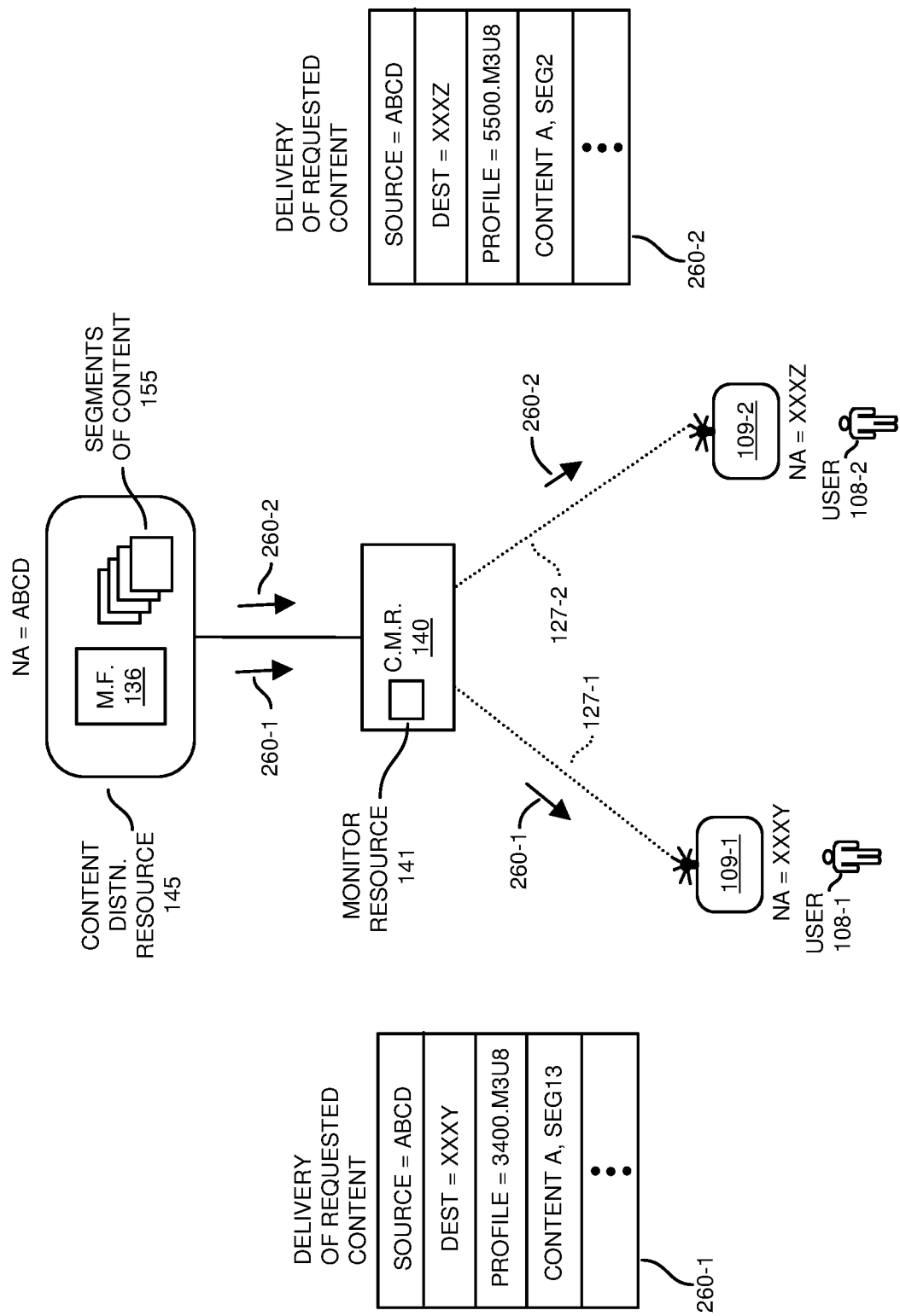
FIG. 6 is an example diagram illustrating interception and inspection of data flows (such as actual transmission of segments of content and/or corresponding metadata) according to embodiments herein.

FIG. 6 is an example diagram illustrating interception and inspection of data flows (such as transmission of segments of content) according to embodiments herein.

In accordance with further embodiments, as previously discussed, the monitor resource 141 can be configured to monitor and track the actual adaptive bit rates associated with the segments of content actually delivered to each of the multiple playback devices.

For example, as previously discussed, the playback device (communication device) can be configured to retrieve the segments of content via selection amongst multiple available retrieval bit rates as specified by a manifest file. In one embodiment, to determine a video quality of content being conveyed and played back on the playback device, the monitor resource 141 determines and tracks adaptive bit rates at which the segments of content are actually delivered as shown in FIG. 6.

In this example embodiment, the communication management resource 140 and monitor resource 141 intercepts response 260-1 communicated from the content distribution resource 145 to playback device 109-1. Via source=ABCD in a respective data field, the response 260-1 indicates the content distribution resource 145 as sending the response 260-1. Via destination=XXXY, the request response 260-1 further indicates the playback device 109-1 being a destination to which the segment of content (content A, segment 13) is being delivered.

In one embodiment, the monitor resource 141 uses profile information=3400.M3.U8 (or other suitable information) in the response 260-1 to determine the adaptive bit rate associated with the conveyed segment of content.

The monitor resource 141 can be configured to track each of multiple responses 260-1 over time from the content distribution resource 145 to track different rates (such as specified by values 5500, 3400, 1400, etc., in the responses 260-1) at which the playback device 109-1 retrieves the segments of content for playback. For example, first segments of a title of content can be retrieved at a first selected adaptive bit rate 5500, second segments of the title of content can be retrieved at a second selected adaptive bit rate 3400, third segments of the title of content can be retrieved at a third selected adaptive bit rate 1400, and so on.

In a similar manner, the communication management resource 140 intercepts and monitor resource 141 inspect requests 250-2 from the content distribution resource 145 to determine (from source=ABCD) that the content distribution resource 145 sent the response (including the specific requested segment of content), what stream of content and segment or segments (content A segment 2) are being delivered, the adaptive bit rate profile (profile=5500.M3U8) associated with the requested segment of content, etc.

In certain instances, note that a low bit rate delivery to playback devices may be caused by a low bandwidth subscription assigned to the subscriber domain 150. In such an instance, the service provider (associated with content distribution resource 145 and shared communication link 195) may notify the head-of-household user in the subscriber domain 150 of the option to upgrade a respective delivery service for an extra fee, which would afford increased bandwidth to the subscriber domain 150.

FIG. 7 is an example diagram illustrating an example report indicating variability in bandwidth and link quality associated with requested segments of content according to embodiments herein.

In this example embodiment, based on monitoring of communications between the playback device 109-1 and the content distribution resource 145 via the communication management resource 140, the monitor resource 141 produces the report 170-1. As shown, the report 110-1 indicates the level of quality of conveying segments of content to the playback device 109-1.

Based on inspection of data packets (such as communications 250-1 and/or communications 260-1 indicating profile value 3400.m3.u8) at or around time T0, the monitor resource 141 determines that the playback device 109-1 receives sufficient bandwidth to retrieve content at the level of quality #2 played back between T0 and T1; based on inspection of data packets (such as communications 250-1 and/or communications 260-1 indicating profile value 3400.m3.u8) at or around time T1, the monitor resource 141 determines that the playback device 109-1 receives sufficient bandwidth to retrieve content at the level of quality #2 played back between T1 and T2; based on inspection of data packets (such as communications 250-1 and/or communications 260-1 indicating profile value 1400.m3.u8) at or around time T2, the monitor resource 141 determines that the playback device 109-1 receives sufficient bandwidth to retrieve content at the level of quality #3 played back between T2 and T3; based on inspection of data packets (such as communications 250-1 and/or communications 260-1 indicating profile value 900.m3.u8) at or around time T3, the monitor resource 141 determines that the playback device 109-1 receives sufficient bandwidth to retrieve content at the level of quality #4 played back between T3 and T4; and so on.

Thus, based on monitoring of communications between the playback device 109-1 and the content distribution resource 145 via the communication management resource 140, the monitor resource 141 produces the report 170-1. As shown, the report 170-1 indicates the level of quality of conveying segments of content to the playback device 109-2.

Assume that the playback device 109-2 retrieves segments of content starting at time T5. Based on inspection of data packets (such as communications 250-2 and/or communications 260-2 indicating profile value 1400.m3.u8) at or around time T5, the monitor resource 141 determines that the playback device 109-2 receives sufficient bandwidth to retrieve content at the level of quality #3 played back between T5 and T6; based on inspection of data packets (such as communications 250-2 and/or communications 260-2 indicating profile value 3400.m3.u8) at or around time T6, the monitor resource 141 determines that the playback device 109-1 receives sufficient bandwidth to retrieve content at the level of quality #2 played back between T6 and T7; based on inspection of data packets (such as communications 250-2 and/or communications 260-2 indicating profile value 900.m3.u8) at or around time T7, the monitor resource 141 determines that the playback device 109-2 receives sufficient bandwidth to retrieve content at the level of quality #4 played back between T7 and T8; based on inspection of data packets (such as communications 250-2 and/or communications 260-2 indicating profile value 900.m3.u8) at or around time T8, the monitor resource 141 determines that the playback device 109-2 receives sufficient bandwidth to retrieve content at the level of quality #4 played back between T8 and T9; based on inspection of data packets (such as communications 250-2 and/or communications 260-2 indicating profile value 900.m3.u8) at or around time T9, the monitor resource 141 determines that the playback device 109-2 receives sufficient bandwidth to retrieve content at the level of quality #5 played back between T9 and T10; and so on.

One reason that the viewing experience may decrease at or around T8 and thereafter is the simultaneous use of bandwidth to subscriber domain 150 based on segments of content retrieved by playback device 109-1 and playback device 109-2.

Note again that variation in an adaptive bit rate of retrieving segments of content by the playback device can occur for any number of reasons. For example, in one embodiment, the adaptive bit rate associated with retrieving segments of content falls below the bandwidth threshold value based on occurrence of a fault condition such as associated with any component (such as playback device 109, communication link 127, communication management resource 140, shared communication link 195, content distribution resource 145, etc.) between the playback device 109 and the content distribution resource 145.

In accordance with further embodiments, to correct a detected anomaly or fault condition (such as congestion causing poor video playback quality by the client playback device), the monitor resource 141 communicates the reports 170 and potentially health status information associated with one or more of the playback device 109, communication link 127, communication management resource 140, shared communication link 195, and content distribution resource 145) associated with the fault to a remote management entity such as analyzer 175.

In one embodiment, based on analysis of the health status information and/or reports 170, the analyzer 175 at the remote management entity (analyzer domain 160 or analyzer 175) dispatches a technician (such as personnel 198) to fix the fault in the communication path between the content distribution resource 145 and the playback device 192 associated with the subscriber. Thus, in one embodiment, the subscriber experiencing poor bandwidth service via a shared communication link need not call a service provider to correct a fault condition because the reports 170 provide appropriate notification of a possible fault condition.

Figure 8:
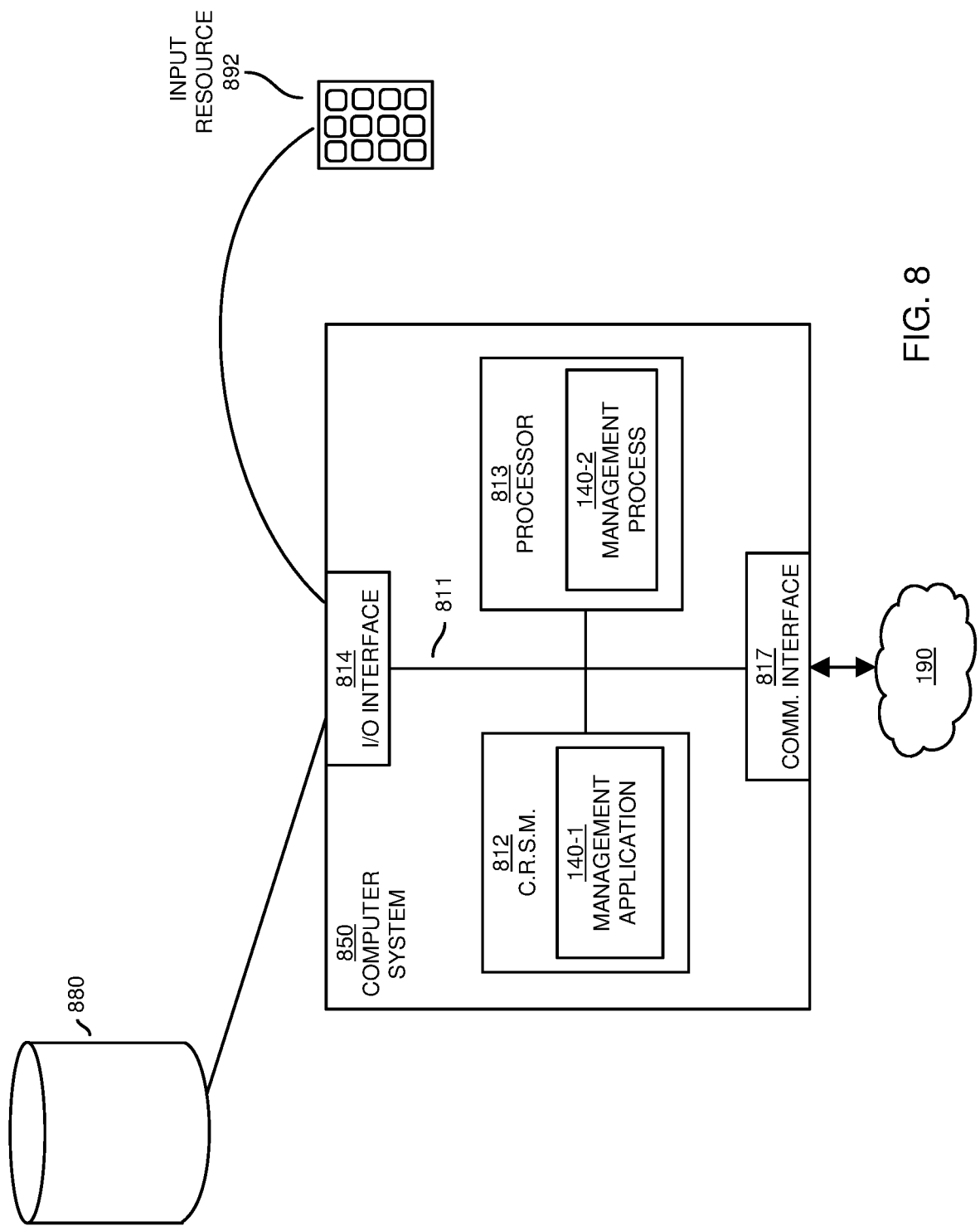
FIG. 8 is an example diagram illustrating example computer architecture operable to execute one or more operations according to embodiments herein.

FIG. 8 is an example block diagram of a computer system for implementing any of the operations as previously discussed according to embodiments herein.

Any of the resources (such as each of the playback devices, communication management resource, monitor resource, content distribution resource, analyzer resource, trigger condition) as discussed herein can be configured to include computer processor hardware and/or corresponding executable (software) instructions to carry out the different operations as discussed herein.

As shown, computer system 850 of the present example includes an interconnect 811 coupling computer readable storage media 812 such as a non-transitory type of media (which can be any suitable type of hardware storage medium in which digital information can be stored and retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in in the management application 140-1 stored on computer readable storage medium 812. Execution of the management application 140-1 produces management process 140-2 to carry out any of the operations and/or processes as discussed herein.

Those skilled in the art will understand that the computer system 850 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, wireless communication device, gateway resource, communication management resource, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowchart in FIGS. 9 and 10. Note that the steps in the flowcharts below can be executed in any suitable order.

Figure 9:
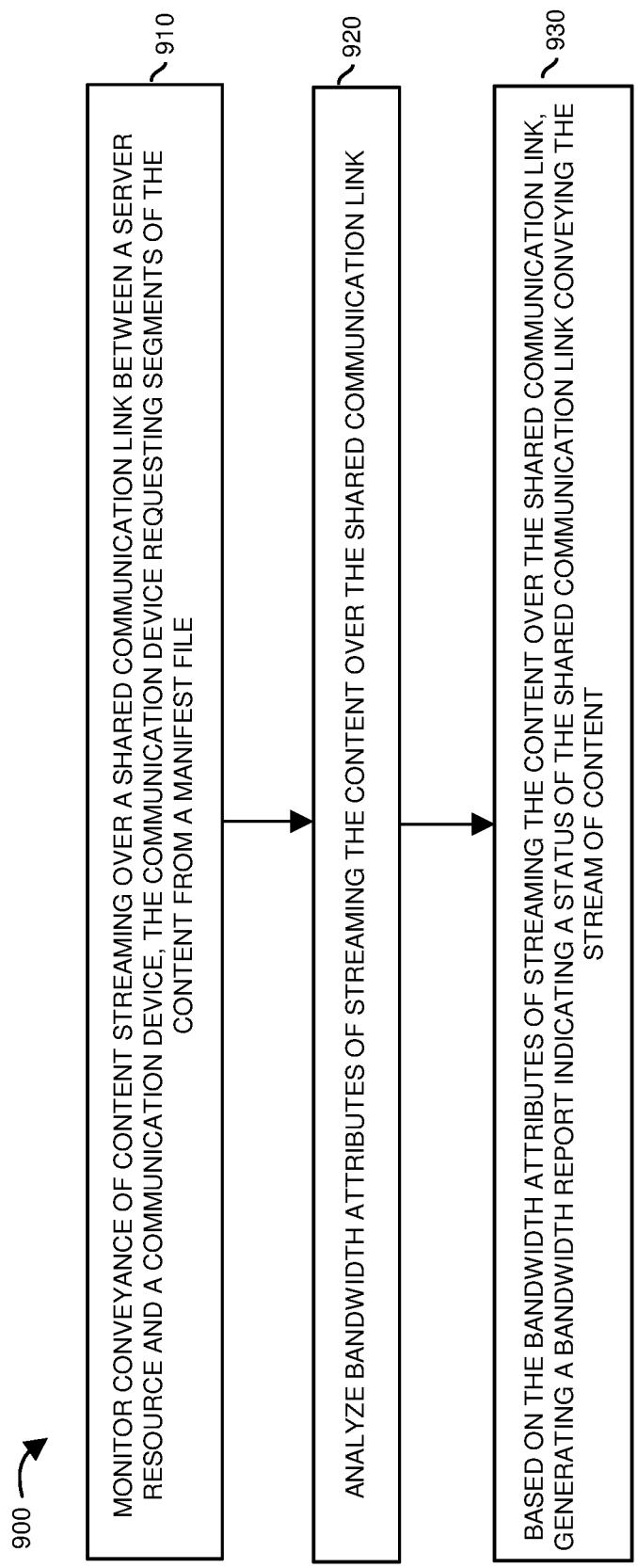
FIG. 9 is an example diagram illustrating a method according to embodiments herein.

FIG. 9 is a flowchart 900 illustrating an example method according to embodiments herein. Note that there will be some overlap with respect to concepts as discussed above.

In processing operation 910, the monitor resource 140 monitors conveyance of content streaming over a shared communication path between the content distribution resource 145 and a playback device. As previously discussed, the playback device requests segments of content from a manifest file.

In processing operation 920, the monitor resource 140 analyzes attributes of streaming the content over the communication path.

In processing operation 930, based on the attributes of streaming the content over the shared communication link, the monitor resource 140 generates a bandwidth report indicating a status of the communication path conveying the requested segments of content.

Figure 10:
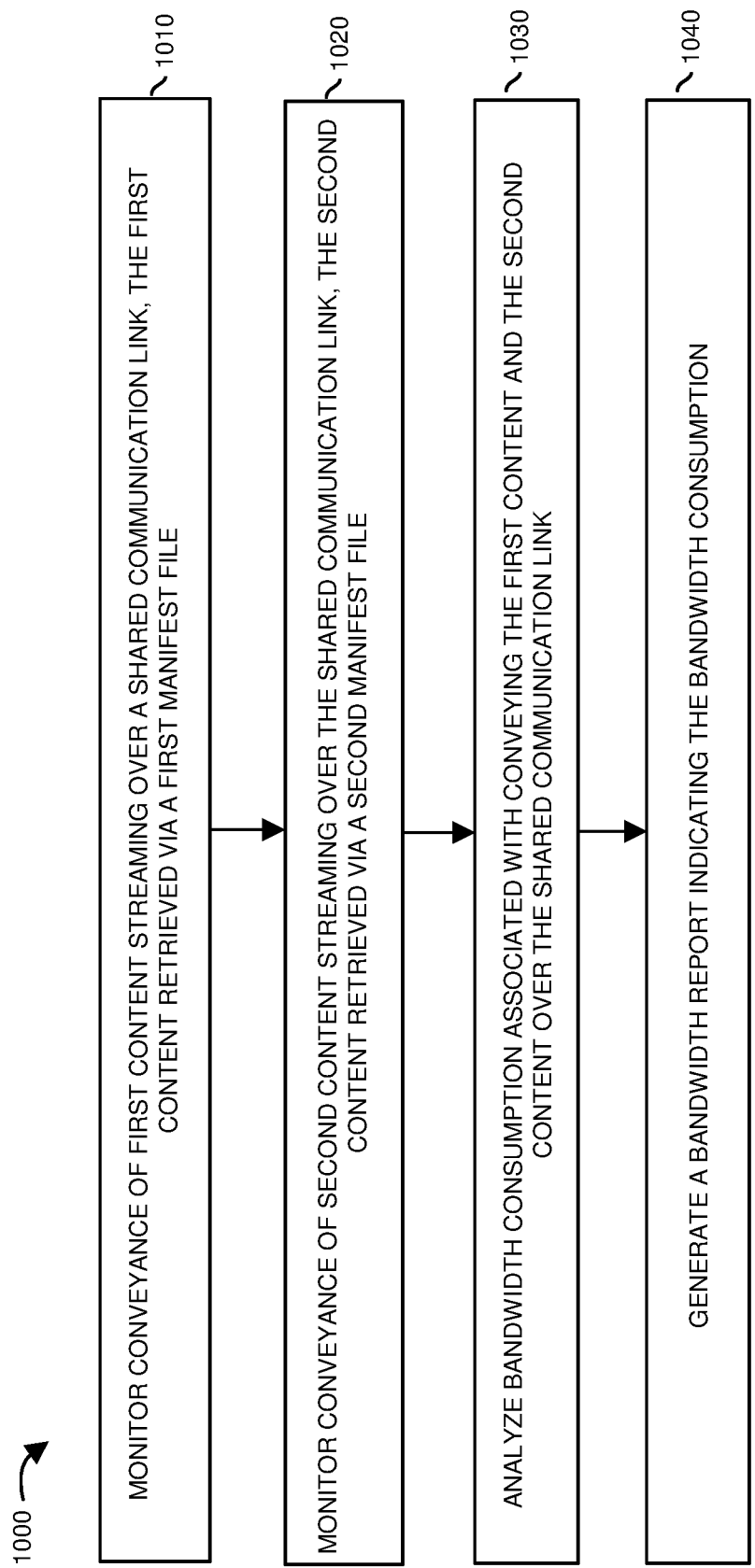
FIG. 10 is an example diagram illustrating a method according to embodiments herein.

FIG. 10 is a flowchart 1000 illustrating an example method according to embodiments herein. Note that there will be some overlap with respect to concepts as discussed above.

In processing operation 1010, the monitor resource 140 monitors conveyance of first content streaming over a shared communication link, the first content retrieved via a first manifest file.

In processing operation 1020, the monitor resource 140 monitor conveyance of second content streaming over the shared communication link, the second content retrieved via a second manifest file.

In processing operation 1030, the monitor resource 140 analyzes bandwidth consumption associated with conveying the first content and the second content over the shared communication link.

In processing operation 1040, the monitor resource 140 generates a bandwidth report indicating the bandwidth consumption.

Embodiments herein are useful to a service provider (such as Operators/Technician of an MSO) because they can use the monitor resource 141 to monitor the quality of video experience from different streaming devices in a subscriber domain in a remote manner. For example, a dashboard may be used for each monitored region. The service provider can use these video quality data points from different homes of an entire region (Data Analytics) to take appropriate action before the subscriber informs the service provider about a respective poor viewing experience.

Note that the service provider also can determine from monitoring of data packets as described herein if the current running video program is from a Linear video program or whether it is an advertisement or an On-Demand video along with its current playing video quality.

Test engineer/QA Engineers can use this monitoring application (such as reports 170) to verify the quality of video program during long term stability tests and automation or During regression tests after a new firmware release.

The monitor resource 141 can be implemented for a subscriber or end user. For example, via the monitor resource 141 and reports 170, a service provider can provide information to the subscriber indicating the reason of switching between HD to SD quality video, which could be due to a bandwidth issue in the communication management resource 140 and which can be fixed by the subscriber taking appropriate action such as moving the communication management resource 140 to a new location or changing operation of the communication management resource 140 to a correct channel settings 2.4 GHz/5 GHz or provide notification that too many streaming devices are simultaneously retrieving content over the shared communication link 195 and playing video at same time with in the home.

Note again that techniques herein are well suited to facilitate wireless communications in a wireless network environment over multiple different networks. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this embodiments herein have been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
monitoring conveyance of first video content streaming over a communication link, the first video content retrieved via a first manifest file;
monitoring conveyance of second video content streaming over the communication link, the second video content retrieved via a second manifest file;
analyzing bandwidth usage associated with conveying the first video content and the second video content over the communication link;
generating a report associated with the bandwidth usage, the report indicating user experience quality level rating of viewing playback of the first video content and the second video content; and
wherein analyzing bandwidth usage includes: comparing adaptive bit rates at which segments of the first video content and segments of the second video content are requested for retrieval to a threshold value, the adaptive bit rates determined based on analyzing requests for the segments of the first video content and requests for the segments of the second video content.

2. The method as in claim 1, wherein monitoring conveyance of the first video content streaming over the communication link includes: intercepting first data packets communicated from a first communication device, the first data packets requesting the segments of the first video content from the first manifest file; and
wherein monitoring conveyance of the second video content streaming over the communication link includes: intercepting second data packets communicated from a second communication device, the second data packets requesting the segments of the second video content from the second manifest file.

3. The method as in claim 2, wherein the threshold value is a bandwidth threshold value;
wherein analyzing the bandwidth usage includes:
determining first bandwidth of the communication link used to convey the first video content to the first communication device;
determining second bandwidth of the communication link used to convey the second video content to the second communication device;
summing the first bandwidth and the second bandwidth, a summation of the first bandwidth and the second bandwidth representing an amount of overall bandwidth used by a subscriber domain in which the first communication device and the second communication device reside; and
comparing the summation to the bandwidth threshold value assigned to the subscriber domain.

4. The method as in claim 3 further comprising
in response to detecting a condition in which the summation is less than the bandwidth threshold value, generating the report to include a notification of the detected condition.

5. The method as in claim 1, wherein the report indicates a quality of the communication link as determined from the bandwidth usage.

6. The method as in claim 1, wherein monitoring conveyance of first video content streaming over the communication link includes: i) detecting first adaptive bit rates at which portions of the first video content are requested for retrieval over the communication link, and ii) detecting second adaptive bit rates at which portions of the second video content are requested for retrieval over the communication link; and
wherein analyzing the bandwidth usage includes: i) tracking the first adaptive bit rates at which portions of the first video content are requested for retrieval over the communication link, and ii) tracking the second adaptive bit rates at which portions of the second video content are requested for retrieval over the communication link.

7. The method as in claim 1 further comprising:
communicating the report to a remote management entity, the remote management entity dispatching a technician to fix a fault associated with the communication link based on the report.

8. The method as in claim 1, wherein the first manifest file indicates availability of segments of the first video content and different adaptive bit rates at which the segments of the first video content are retrievable; and
wherein monitoring conveyance of the first video content streaming over the communication link includes: intercepting first data packets communicated from a first communication device, the first data packets requesting the segments of the first video content as specified by the first manifest file.

9. The method as in claim 8, wherein intercepting the first data packets includes:
intercepting a first data packet communicated from the first communication device over the communication link to a content distribution resource, the first data packet requesting to retrieve a first segment of the first video content;
determining a first bit rate as specified by the first data packet, the first bit rate indicating a first level of quality at which the first communication device requests the first segment of the first video content;
intercepting a second data packet communicated from the first communication device over the communication link to the content distribution resource, the second data packet requesting to retrieve a second segment of the first video content; and
determining a second bit rate as specified by the second data packet, the second bit rate indicating a second level of quality at which the first communication device requests the second segment of the first video content, the second bit rate different than the first bit rate.

10. The method as in claim 9, wherein both the first data packet and the second data packet include a first network address assigned to the first communication device, the method further comprising:
utilizing the first network address in the first data packet to determine that the first communication device transmitted the request for the first segment of the first video content; and
utilizing the first network address in the second data packet to determine that the first communication device transmitted the request for the second segment of the first video content.

11. The method as in claim 10 further comprising:
determining bandwidth used by the first communication device to receive the first video content based on the first bit rate as specified by the first data packet and the second bit rate as specified by the second data packet.

12. The method as in claim 1, wherein the first manifest file indicates availability of segments of the first video content and different adaptive bit rates at which the segments of the first video content are retrievable;
wherein the second manifest file indicates availability of segments of the second video content and different adaptive bit rates at which the segments of the second video content are retrievable;
wherein monitoring conveyance of the first video content streaming over the communication link includes: intercepting first data packets communicated from a first communication device, the first data packets requesting segments of the first video content as specified by the first manifest file; and
wherein monitoring conveyance of the second video content streaming over the communication link includes: intercepting second data packets communicated from a second communication device, the second data packets requesting segments of the second video content as specified by the second manifest file.

13. The method as in claim 12, wherein intercepting the first data packets includes: i) intercepting a first data packet communicated from the first communication device to a content distribution resource, the first data packet requesting to retrieve a first segment of the first video content; ii) determining a first bit rate as specified by the first data packet, the first bit rate indicating a first level of quality at which the first communication device requests the first segment of the first video content; iii) intercepting a second data packet communicated from the first communication device to the content distribution resource, the second data packet requesting to retrieve a second segment of the first video content; and iv) determining a second bit rate as specified by the second data packet, the second bit rate indicating a second level of quality at which the first communication device requests the second segment of the first video content; and
wherein intercepting the second data packets includes: i) intercepting a third data packet communicated from the second communication device to the content distribution resource, the third data packet requesting to retrieve a first segment of the second video content; ii) determining a third bit rate as specified by the third data packet, the third bit rate indicating a first level of quality at which the second communication device requests the first segment of the second video content; iii) intercepting a fourth data packet communicated from the second communication device to the content distribution resource, the fourth data packet requesting to retrieve a second segment of the second video content; and iv) determining a fourth bit rate as specified by the fourth data packet, the fourth bit rate indicating a fourth level of quality at which the second communication device requests the second segment of the second video content.

14. The method as in claim 13, wherein both the first data packet and the second data packet include a first network address assigned to the first communication device, the method further comprising:
utilizing the first network address in the first data packet to determine that the first communication device transmitted the request for the first segment of the first video content;
utilizing the first network address in the second data packet to determine that the first communication device transmitted the request for the second segment of the first video content;
wherein both the third data packet and the fourth data packet include a second network address assigned to the second communication device, the method further comprising:
utilizing the second network address in the third data packet to determine that the third communication device transmitted the request for the first segment of the second video content; and
utilizing the second network address in the fourth data packet to determine that the second communication device transmitted the request for the second segment of the second video content.

15. The method as in claim 14, wherein analyzing bandwidth usage includes:
- determining first bandwidth used by the first communication device to retrieve the first video content based on the first bit rate as specified by the first data packet and the second bit rate as specified by the second data packet; and
- determining second bandwidth used by the second communication device to retrieve the second video content based on the third bit rate as specified by the third data packet and the fourth bit rate as specified by the fourth data packet.

16. The method as in claim 1, wherein monitoring conveyance of the first video content includes: i) via a gateway, intercepting first requests communicated from a first communication device retrieving the segments of the first video content; ii) processing the first requests to determine first different bit rates at which the first communication device requests retrieval of the segments of the first video content;
- wherein monitoring conveyance of the second video content includes: i) via the gateway, intercepting second requests communicated from a second communication device retrieving the segments of the second video content; ii) processing the second requests to determine second different bit rates at which the second communication device requests retrieval of the segments of the second video content; and
- wherein analyzing the bandwidth usage includes: determining the bandwidth usage based on: i) the first different bit rates at which the first communication device requests the first video content and ii) the second different bit rates at which the second communication device requests retrieval of the segments of the second video content.

17. A system comprising:
a communication management resource operative to:
- monitor conveyance of first video content streaming over a shared communication link, the first video content retrieved via a first manifest file;
- monitor conveyance of second video content streaming over the shared communication link, the second video content retrieved via a second manifest file;
- analyze bandwidth usage associated with conveying the first video content and the second video content over the shared communication link; and
- generate a report associated with the bandwidth consumption, the report indicating user experience quality level rating of viewing playback of the first video content and the second video content; and
- wherein the communication management resource is further operative to: compare adaptive bit rates at which segments of the first video content and segments of the second video content are requested for retrieval to a threshold valve, the adaptive bit rates determined based on analyzing the segments of the first video content and the segments of the second video content.

18. The system as in claim 17, wherein the communication management resource is further operative to:
- determine first bandwidth of the communication link used to convey the first video content to the first communication device;
- determine second bandwidth of the communication link used to convey the second video content to the second communication device;
- sum the first bandwidth and the second bandwidth, a summation of which represents an amount of overall bandwidth used by a subscriber domain in which the first communication device and the second communication device reside; and
- compare the summation to a bandwidth threshold value assigned to the subscriber domain.

19. The system as in claim 18, wherein the communication management resource is further operative to:
- in response to detecting a condition in which the summation is less than the bandwidth threshold value, generate the report to include a notification of the detected condition.

20. The system as in claim 17, wherein the report indicates a quality of the communication link as determined from the bandwidth usage.

21. The system as in claim 17, wherein the communication management resource is further operative to:
- communicate the report to a remote management entity, the remote management entity dispatching a technician to fix a fault associated with the communication link.

22. Computer-readable storage hardware having instructions stored thereon, the instructions, when carried out by computer processor hardware, cause the computer processor hardware to:
- monitor conveyance of first video content streaming over a shared communication link, the first video content retrieved via a first manifest file;
- monitor conveyance of second video content streaming over the shared communication link, the second video content retrieved via a second manifest file;
- analyze bandwidth usage associated with conveying the first video content and the second video content over the shared communication link;
- generate a report associated with the bandwidth consumption, the report indicating user experience quality level rating of viewing playback of the first video content and the second video content; and
- wherein analysis of the bandwidth usage includes: comparison of adaptive bit rates at which segments of the first video content and segments of the second video content are requested for retrieval to a threshold value, the adaptive bit rates determined based on analysis of requests for the segments of the first video content and requests for the segments of the second video content.

23. A method comprising:
monitoring conveyance of first video content streaming over a communication link, the first video content retrieved via a first manifest file;
monitoring conveyance of second video content streaming over the communication link, the second video content retrieved via a second manifest file;
analyzing bandwidth usage associated with conveying the first video content and the second video content over the communication link;
generating a report associated with the bandwidth usage, the report indicating user experience quality level rating of viewing playback of the first video content and the second video content; and
wherein analyzing bandwidth usage includes: comparing adaptive bit rates at which segments of the first video content and segments of the second video content are requested for retrieval to a threshold value, the adaptive bit rates determined based on analyzing the segments of the first video content and the segments of the second video content.

24. The method as in claim 23, wherein analyzing the bandwidth usage includes:
tracking first adaptive bit rates at which the segments of the first video content are conveyed over the communication link to a first communication device; and
tracking second adaptive bit rates at which the segments of the second video content are conveyed over the communication link to a second communication device.

25. The method as in claim 23, wherein the first manifest file indicates availability of the segments of the first video content and different adaptive bit rates at which the segments of the first video content are retrievable; and
wherein monitoring conveyance of the first video content streaming over the communication link includes: intercepting first data packets communicated from a video content distribution resource to a first communication device, the first data packets including segments of the first video content as requested by the first communication device from the first manifest file.

26. The method as in claim 25, wherein intercepting the first data packets includes:
intercepting a first data packet communicated from the video content distribution resource to the first communication device, the first data packet including a first segment of the first video content requested by the first communication device;
determining a first bit rate at which the first segment of the first video content in the first data packet is encoded, the first bit rate indicating a first level of quality of the first segment of the first video content requested by the first communication device;
intercepting a second data packet communicated from the content distribution resource to the first communication device, the second data packet including a second segment of the first video content requested by the first communication device; and
determining a second bit rate at which the second segment of the first video content in the second data packet is encoded, the second bit rate indicating a second level of quality of the second segment of the first video content requested by the first communication device, the second level of quality different than the first level of quality.

27. The method as in claim 26, wherein both the first data packet and the second data packet include a network address assigned to the first communication device, the method further comprising:
utilizing the network address in the first data packet to determine that the first communication device requested the first segment of the first video content; and
utilizing the network address in the second data packet to determine that the first communication device requested the second segment of the first video content.

28. The method as in claim 27 further comprising:
determining bandwidth used by the first communication device to retrieve the first video content based on the first bit rate as specified by the first data packet and the second bit rate as specified by the second data packet.

29. The method as in claim 23, wherein analyzing bandwidth usage associated with conveying the first video content and the second video content over the communication link includes:
at a gateway, intercepting segments of the first video content retrieved by a first communication device;
processing the segments of the first video content to determine first different bit rates at which the first communication device requests retrieval of the segments of the first video content;
at the gateway, intercepting segments of the second video content retrieved by the second communication device;
processing the segments of the second video content to determine second different bit rates at which the second communication device requests retrieval of the segments of the second video content; and
wherein analyzing the bandwidth usage includes determining the bandwidth usage based on: i) the first different bit rates at which the first communication device requests the first video content, and ii) the second different bit rates at which the second communication device requests retrieval of the segments of the second video content.

* * * * *

UNITED STATES PATENT AND TRADEMARK OFFICE
CERTIFICATE OF CORRECTION

| | |
|---|---|
| PATENT NO. | : 11,750,862 B2 |
| APPLICATION NO. | : 17/375664 |
| DATED | : September 5, 2023 |
| INVENTOR(S) | : Ajit Kumar Patro and Puneet Singh |

It is certified that error appears in the above-identified patent and that said Letters Patent is hereby corrected as shown below:

In the Claims

Claim 17, Line 20, replace "valve" with --value--

Signed and Sealed this
Thirty-first Day of October, 2023

*Katherine Kelly Vidal*
Katherine Kelly Vidal
*Director of the United States Patent and Trademark Office*